United States Patent [19]

Mason

[11] Patent Number: 5,283,492
[45] Date of Patent: Feb. 1, 1994

[54] MULTIPLE MAGNETIC POLE DC MOTORS

[76] Inventor: Elmer B. Mason, 901 Vickie Dr., Del City, Okla. 73115

[21] Appl. No.: 4,153

[22] Filed: Jan. 13, 1993

Related U.S. Application Data

[63] Continuation-in-part of Ser. No. 870,861, Apr. 20, 1992.

[51] Int. Cl.⁵ .......................................... H02K 16/02
[52] U.S. Cl. .................................... 310/114; 310/112
[58] Field of Search ............... 310/114, 112, 124, 152, 310/40.5, 126, 40 MM

[56] References Cited

U.S. PATENT DOCUMENTS

| | | | |
|---|---|---|---|
| 881,585 | 3/1908 | Hopkinson et al. | 310/112 |
| 3,717,780 | 2/1973 | Hohne, Jr. et al. | 310/112 |
| 3,863,084 | 1/1975 | Hasebe | 310/114 X |
| 4,221,984 | 9/1980 | Mason | 310/112 |
| 4,316,099 | 2/1982 | Mason | 310/114 |
| 4,316,109 | 2/1982 | Mason | 310/114 |
| 5,212,418 | 5/1983 | Mason | 310/114 |

Primary Examiner—Steven L. Stephan
Assistant Examiner—Ed To
Attorney, Agent, or Firm—Robert K. Rhea

[57] ABSTRACT

A direct current motor having one or more armatures supported between magnetic pole plates having pairs of pole pieces extending, in diametric opposition with respect to the periphery of an armature between the plates adjacent the perimeter of the armature or armatures, and is energized by direct current through one or more iron coil cores interposed between and connected with the magnetic pole plates. Wiring and electrical current controls connect a DC source to the coils and armatures for selectively operating the armatures and providing a selected torque with a minimum of ampere drain from the DC source.

3 Claims, 7 Drawing Sheets

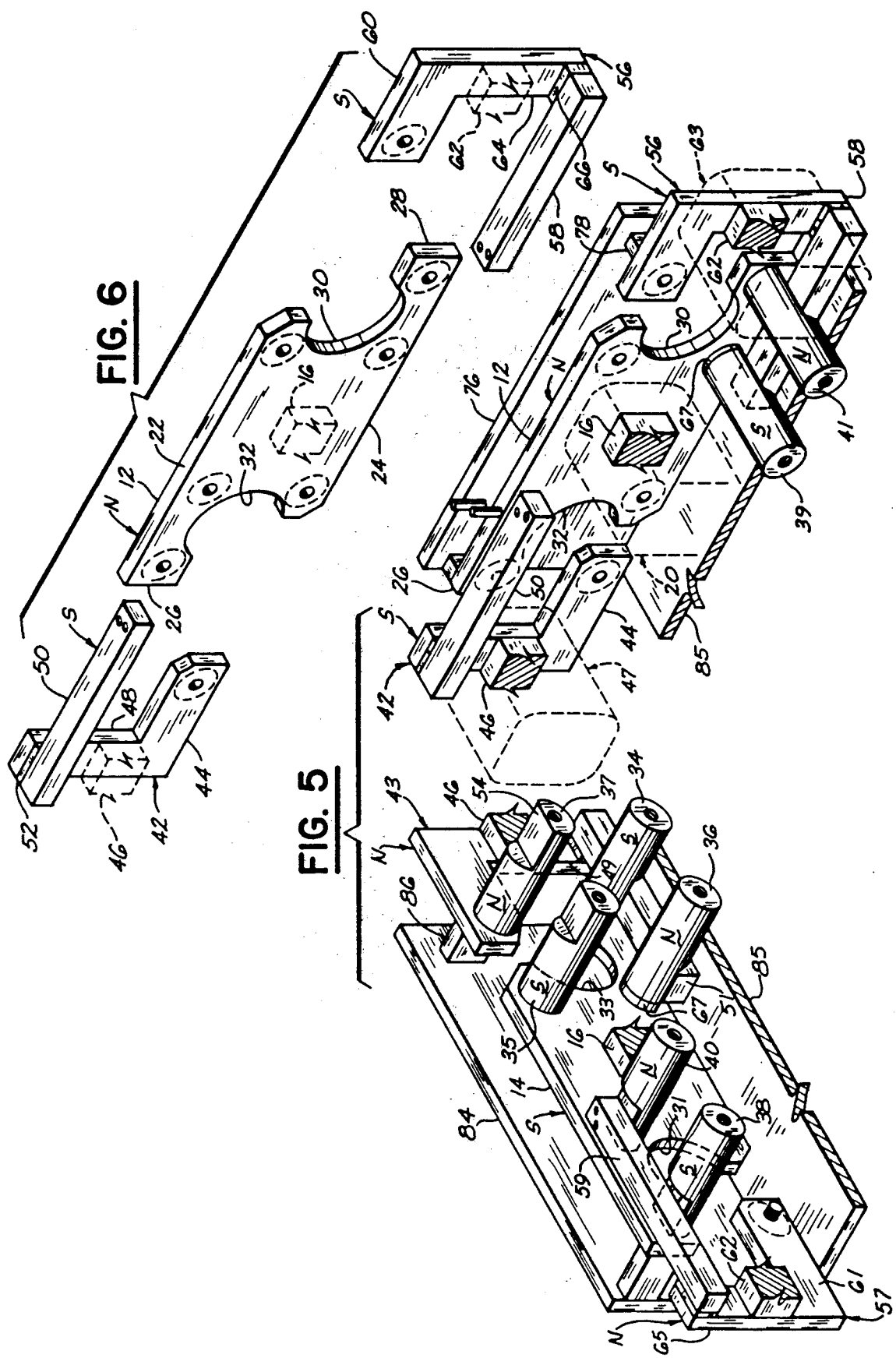

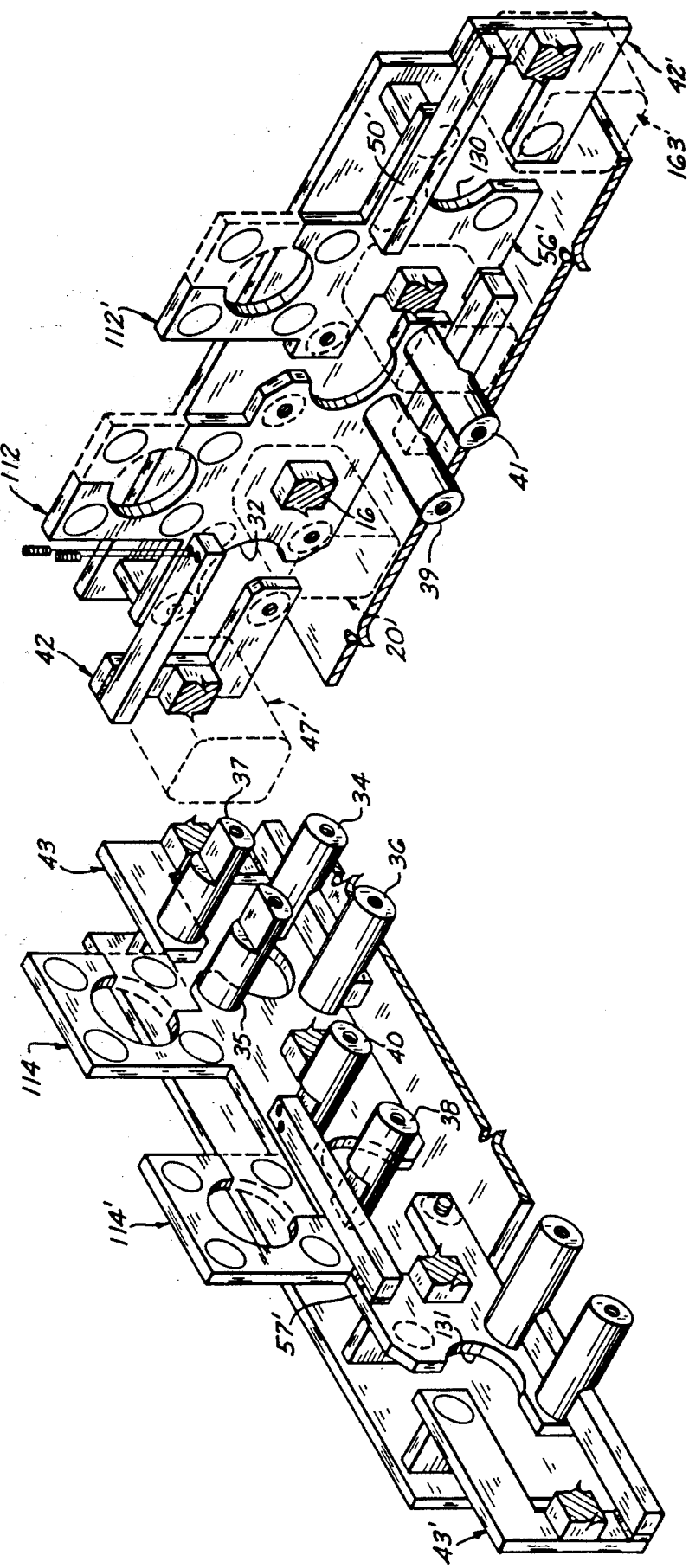

MULTIPLE MAGNETIC POLE DC MOTORS

This application is a continuation-in-part of an application filed by me in the United States Patent and Trademark Office on Apr. 20, 1992 under Ser. No. 07/870,861 for High Torque and Speed Motors, now U.S. Pat. No. 5,212,418, issued May 18, 1993.

BACKGROUND OF THE INVENTION

1. Field of the Invention

This invention relates to direct current motors and more particularly to multiarmature motors having coils or magnets interposed between parallel pole pieces establishing a plurality of magnetic poles for exciting armatures.

Conventional direct current motors usually comprise a housing journalling an armature with sectional field coils or stator windings contained by the housing which substantially surround the armature to provide a magnetic circuit for exciting the armature.

In this type of design only one armature is operated by each group of stators or field windings resulting in inefficient utilization of the various circuits established and thus limiting the potential of the magnetic circuit established by direct current through coils interposed between magnetizable pole pieces.

The number of rotors which may be interposed between and operated by the magnetic flux of pole pieces established by one or more coils from a single direct current source is almost unlimited as disclosed by this invention.

2. Description of the Prior Art

The most pertinent patents are believed to be my U.S. Pat. No. 4,221,984 issued to me on Sep. 9, 1980 for Stator For Multiple Rotor D.C. Magnetic Motor and U.S. Pat. Nos. 4,316,099 and 4,316,109 issued to me on Feb. 16, 1982 for Permanent Magnet Stator For D.C. Motors and Stator For Multi-Rotor D.C. Magnetic Motors, respectively.

My U.S. Pat. No. 4,221,984 discloses some of the features of the motors of this invention, but does not disclose the feature and advantage of including magnetic flux of the same polarity at both ends of pole pieces extending longitudinally of and armature for obtaining desired torque and speed of the respective armature with relation to efficient use of input amperage as disclosed by this invention.

The other two of my above named patents (U.S. Pat. Nos. 4,316, 099 and 4,316,109) disclose one of the essential features of this invention, namely, the dimension of the respective pole piece arc in relation to the winding span of the respective armature and each disclose concentric armature rotating motors for a specific purpose.

SUMMARY OF THE INVENTION

Direct current motors are formed by armatures interposed between parallel opposing plates and pole pieces magnetized by permanent magnets or coils wound on cores extending between the plates and energized by direct current from a source.

Elongated members normal to and connected with the respective plate form pairs of opposite polarity pole pieces in diametric opposition on the respective armature.

Wiring and substantially conventional electrical controls connecting a direct current source with the coils and armatures are selectively operated resulting in motors formed by respective armatures having high speed, high torque, and low amperage input motors in which the direction of rotation is easily reversed by changing the direction of current through the commutators, one or more coils or the position of brushes on the commutators of the respective armatures.

The principal object of this invention is to provide direct current motors and/or generators which find high utilization in industry or for nonindustrial users.

BRIEF DESCRIPTION OF THE DRAWINGS

FIG. 5 is an exploded perspective view of the motor pole plates and pole pieces;

FIG. 6 is an exploded perspective view of the north N and south S magnetic pole plates, per se, at one side of the assembly of FIG. 5;

FIG. 8 is a view similar to FIG. 5 illustrating one manner of expanding the area of the pole plates and placement of additional armatures;

DESCRIPTION OF THE PREFERRED EMBODIMENTS

Figure 1:
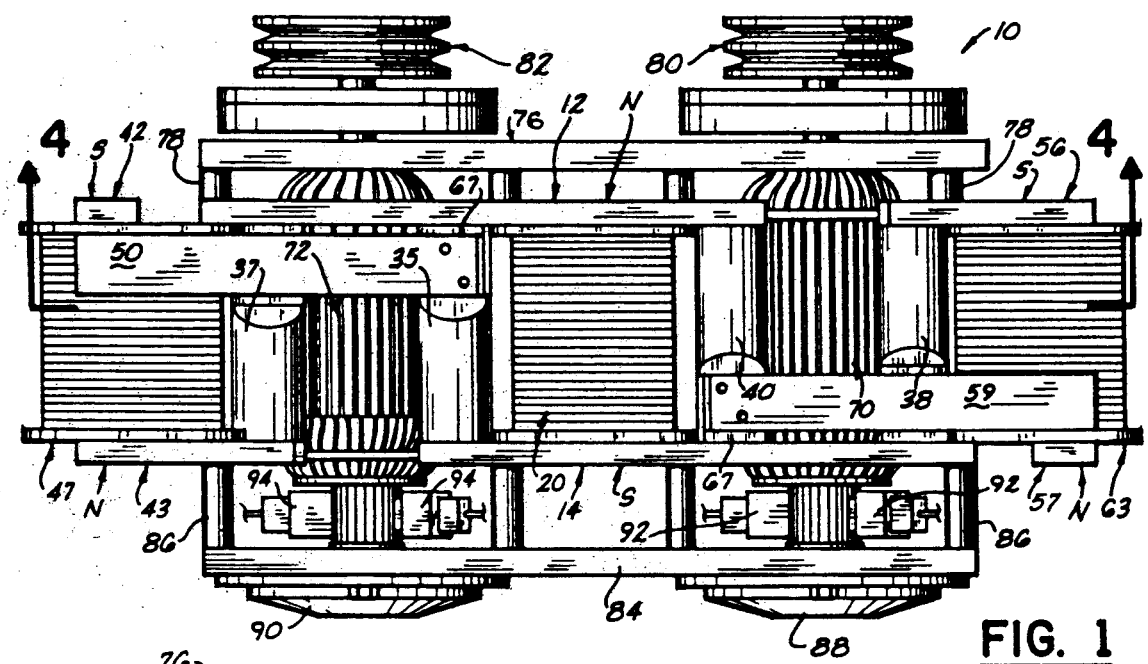
FIG. 1 is a top view of one embodiment of a two armature DC motor with the motor housing top removed.
Figure 2:
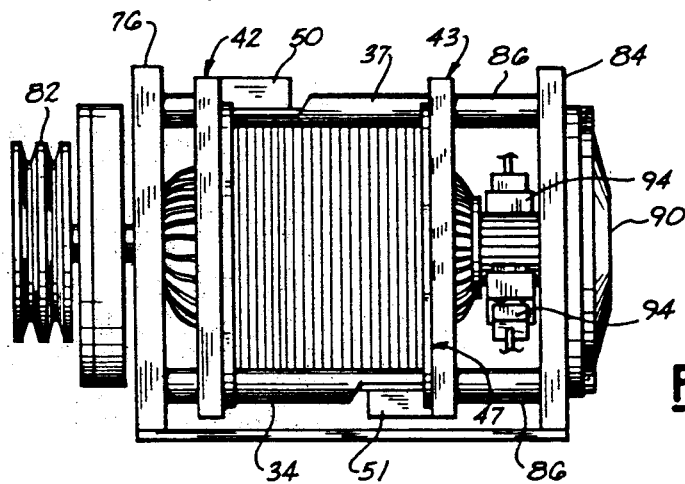
FIG. 2 is a left end elevational view of FIG. 1.
Figure 3:
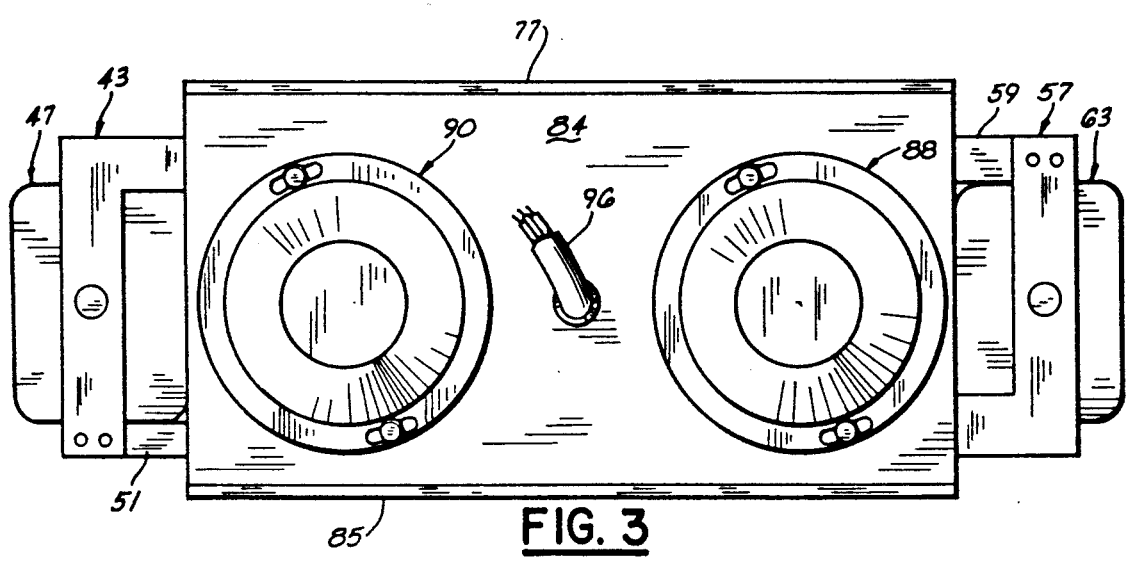
FIG. 3 is a front elevational view of FIG. 1.

Like characters of reference designate like parts in those figures of the drawings in which they occur.

In the drawings:

Referring more particularly to FIGS. 1-6, the reference numeral 10 indicates one embodiment of a dual armature direct current electric motor assembly having a plurality of opposing magnetic pole plates and pieces in accordance with this invention.

The motor 10 includes a pair of planar plate-like spaced-apart magnetizable pole plates 12 and 14 interconnected intermediate their ends by a rectangular coil core 16 (FIG. 4) of predetermined length.

Figure 7:
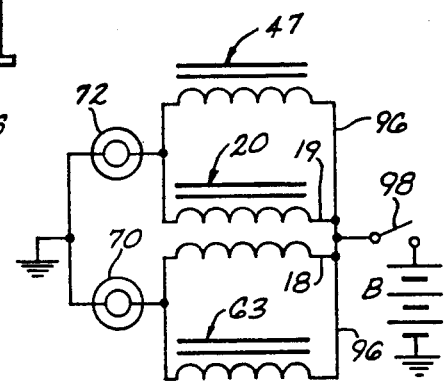
FIG. 7 is a wiring diagram.

A pair of wires 18 and 19 (FIG. 7) are wrapped two in-hand around the coil core 16 to form a coil 20, substantially rectangular, when viewed from either end of the coil (FIG. 4), for the reasons more fully explained hereinbelow.

Obviously a single or plurality of wires, preferably an even number, of the same or different gauge may be simultaneously wound in-hand around the coil core for saturating pole plates and pole pieces with a selected flux density or polarity for armature speed control. This feature substantially eliminates the necessity of resistors in the control circuit.

When energizd by electric DC potential, as presently explained, the coil 20 forms a north N and a south S magnetic pole of the respective plates 12 and 14. As best illustrated by FIG. 6, the north N pole plate 12 is rectangular in general configuration having top and bottom parallel edges 22 and 24, respectively, and end surfaces 26 and 28, respectively.

A pair of equal diameter apertures are formed in the respective end portions of the plate 12 and diagonally opposite corner portions of the plate 12 are removed leaving respective circular arcs 30 and 32 defining the remainder of the apertures of slightly greater than 180°.

The purpose of removing a diagonal opposite corner portion of the plate 12 is to divide the magnetic flux at each end of the pole plate and reduce heat generated therein and in an armature supported within the respective arc.

The other pole plate 14 is identical in appearance and size, with respect to the pole plate 12, and is simply inverted from the position, shown by the pole plate 12, before the two plates are joined by the core 16 of the coil 20. When joined by the coil core 16, the respective arcs 30-31 and 32-33 in the pole plates 12 and 14 are in axial alignment. Two pairs of rod members 34-35 and 36-37 of selected length form opposite polarity pole pieces extending between and connected at their respective ends to north N and south S pole plates in diametric opposition around the arcs 32-33, as presently explained.

Similarly two pairs of substantially identical pole pieces 38-39 and 40-41 extend between and are connected at their respective ends to the north N and south S pole plates in diametric opposition around the arcs 30-31.

To support the end of the south S pole piece 34, projecting toward the area opposite the arc 32, an L-shaped planar south S pole plate 42 (FIG. 6) lying in the plane of the north pole plate 12 has its foot portion 44 projecting toward the pole plate 12 in cooperative relation with respect to the arc 32 for connection with the adjacent end of the south S pole piece 34. A coil core 46, having a single wire wrapped around it forming a coil 47, is connected with the leg portion 48 of the L-shaped pole plate 42 so that the L-shaped plate 42 forms a south pole S. The upper end portion of the leg 48 is connected in magnetic flux conducting relation with an elongated horizontal arm 50 parallel with the plane common to pole plates 12 and 42, but magnetically spaced therefrom by a spacer 52 interposed between the arm 50 and leg 48. The upper surface of the end portion of the north N pole piece 37 adjacent the pole plate 12 is cutaway, as at 54, so that the pole arm 50 may span the pole piece 37 in vertically spaced relation and be connected with the south S pole piece 3 at its end portion adjacent the north plate 12.

A companion L-shaped south S pole piece 56 and pole piece arm 58, formed identical with the L-shaped pole plate 42 and its arm 50 when longitudinally inverted in the direction of the longitudinal axis of the pole arm 50 is disposed at the other or right end portion of the pole plate 12, as viewed in FIG. 6, so that the foot portion 60 is similarly disposed opposite the arc 30 for connection with the adjacent end of the south S pole piece 38.

A third coil core 62 similarly having a single wire wound therearound to form a coil 63 is connected with the leg 64 of the L-shaped pole plate 56 to form a south pole S. Similarly, the pole arm 58 is spaced from the leg 64 by a spacer 66 and projects parallel with the depending edge portion of the pole plate 12 similarly spanning in underlying relation the adjacent end portion of the north N pole piece 41 and is connected, at its end opposite the leg 64, with the end portion of the south S pole piece 39.

Similarly an L-shaped pole plate 43 identical with the pole plate 42 when inverted in a lateral direction is cooperatively disposed at the end portion of the south S pole plate 14 opposite the position of the pole plate 42 and has its leg 49 similarly connected with the other end of the coil core 46 to form a north pole N with its foot portion supporting the adjacent end of the north N pole piece 37 and its arm 51, similarly spanning the south S plate connected end portion of the south S pole piece 34 and connected with the end portion of the north N pole piece 36.

Similarly, an L-shaped pole plate 57 and arm 59 identical with the L-shaped pole plate 56 and arm 58, when inverted laterally from the position of FIG. 6, is disposed adjacent the left end portion of the south S pole plate 14 with its leg portion 65 similarly connected with the other end of the coil core 62 to form a north N pole plate with its foot portion 61 connected with and supporting the adjacent end portion of the north N pole piece 41. The leg 59 similarly spans the adjacent end portion of the south S pole piece 3 and is secured to the adjacent end portion of the north N pole piece 40. The surface defining the cut-off or removed area of each pole piece 34, 37, 38 and 41 is preferably coated with a layer of nonmagnetic flux conducting material, not shown, for reasons believed apparent.

Thus, it may be seen that the north N poles of the coils 20, 47, and 63 are connected, respectively, with the north N plates 12, 43, and 57 and that the pairs of transverse pole pieces 36-37 and 40-41 receiving like pole magnetic flux at each end form north N pole pieces in diametric opposition with respect to armatures disposed within the arcs 30-31 and 32-33, as presently explained. Similarly, the south S poles of the coils 20, 47, 63 are connected with the south S pole plates 14, 42, and 56 and concentrate magnetic flux from the respective south S pole plates in both ends of the pairs of transverse south S pole pieces 34-35 and 38-39.

Nonmagnetic spacers 67 and nonmagnetic screws, not shown, connect the ends of the north N pole pieces 36 and 40 to the south S pole plate 14 and similarly connect the ends of the south S poles pieces 35 and 39 to the north N pole plate 12 for rigidity.

Figure 4:
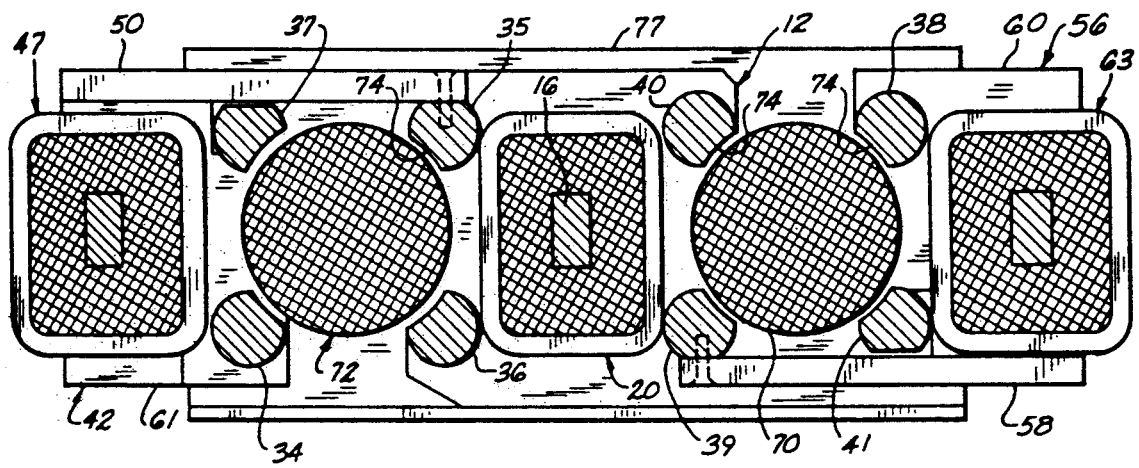
FIG. 4 is a vertical cross sectional view taken substantially along the line 4—4 of FIG. 1.

A pair of electric motor armatures 70 and 72 extend between the respective north N and south S pole plates in axial alignment with the arcs in the respective ends of the pole plates 12 and 14. As best illustrated by FIG. 4, the respective pole piece of the diametrically opposite pairs of pole pieces 34-35, 36-37, 38-39, and 40-41 have a longitudinal peripheral portion of their surface milled out on a radius slightly greater than the radius of the respective armature to define a concave arc on each pole piece of the respective pairs of pole pieces having a transverse width equal with one-half the winding span of the respective armature 70 and 72.

The respective arc 74 of the respective pole piece of the pairs of pole pieces is thus substantially equal to an arc spanning three and one-half spans of a seven span armature.

The preferred radial spacing between the periphery of the respective armature and the arcuate recesses 74 is 0.020", ±0.005" (0.051 cm ±0.103 cm).

A housing wall 76 apertured and provided with bearings, not shown, is positioned in parallel spaced relation with respect to the pole plate 12 and is connected thereto by a plurality of nonmagnetic spacers 78 for journalling the drive end of the armature shafts connected with pulleys 80 and 82.

Similarly, an opposite housing side wall 84 similarly cooperatively apertured and provided with bearings, not shown, journals the commutator end portion of the armature shafts and is connected with the south pole plate 14 by nonmagnetic spacers 86. Housing top and bottom walls 77 and 85 (FIGS. 3 and 4) shield the armatures and central coil 20.

Armature end plates 88 and 90 adjustably connected with the housing side wall 84 support pairs of brushes 92 and 94 mounted on the commutator of the respective armature.

A plurality of wires 96 (FIGS. 3 and 7) connect the potential of a battery B in parallel to the coils and armature commutators through an on/off switch 98 and a circuit controller, not shown.

Referring also to FIG. 8, the magnetic flux generated by the coil 20 may be utilized to drive an additional armature or armatures, not shown, by integrally mounting a rectangular plate on the respective top surface of the pole plates 12 and 14 above the position of the respective ends of the coil 20. These plates being similarly cooperatively apertured for receiving an additional armature and having diagonally opposite corners of the respective pole plates 112 and 114 removed and replaced with nonmagnetic respective corner portions. These additional or extended magnetic plates 112 and 114 similarly support diametrically opposite pairs of cylindrical transverse north N and south S poles, as described hereinabove, for the armatures 70 and 72.

Similarly the motor 10 may be expanded in a longitudinal direction, from either end, by mounting a similar rectangular pole plate 112' on the foot portion of the L-shaped pole plate 56 and extending its leg portion in a longitudinal direction to accommodate an arc 130, thus, forming an expanded version of the L-shaped pole piece 56, designated as 56'.

An L-shaped pole piece and arm 42' and 50' forming a mirror image of the L-shaped pole plate 42 and arm 50 then projects in cooperating longitudinal spaced relation from the arc 130 for receiving an additional armature, not shown, and a fourth coil core and coil 163. The L-shaped south S pole piece 57' is similarly modified for receiving a rectangular upright planar pole piece 114' and its extended leg portion defining an arc 131.

A mirror image of the pole piece 43 indicated at 43' is then cooperatively positioned adjacent the arc 131, as described hereinabove for the pole plates 12 and 14. Similarly diametrically opposite pairs of north N and south S pole pieces extend between the planar plates 112', 114' and the planar surfaces surrounding the arcs 130 and 131.

Figure 9:
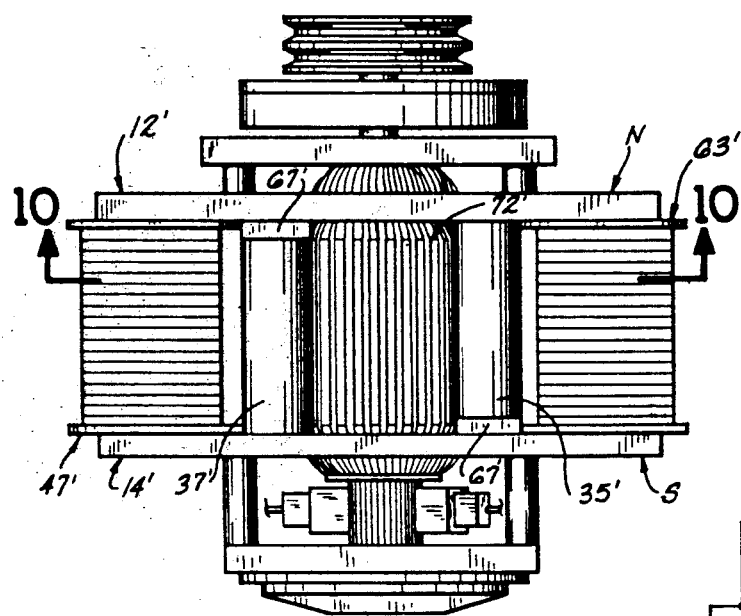
FIG. 9 is a view similar to FIG. 1 illustrating a single armature DC motor.
Figure 10:
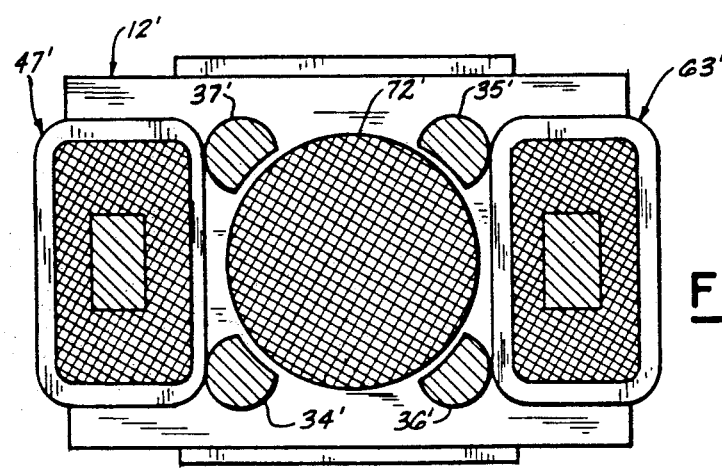
FIG. 10 is a vertical cross sectional view taken substantially along the line 10—10 of FIG. 9.
Figure 11:
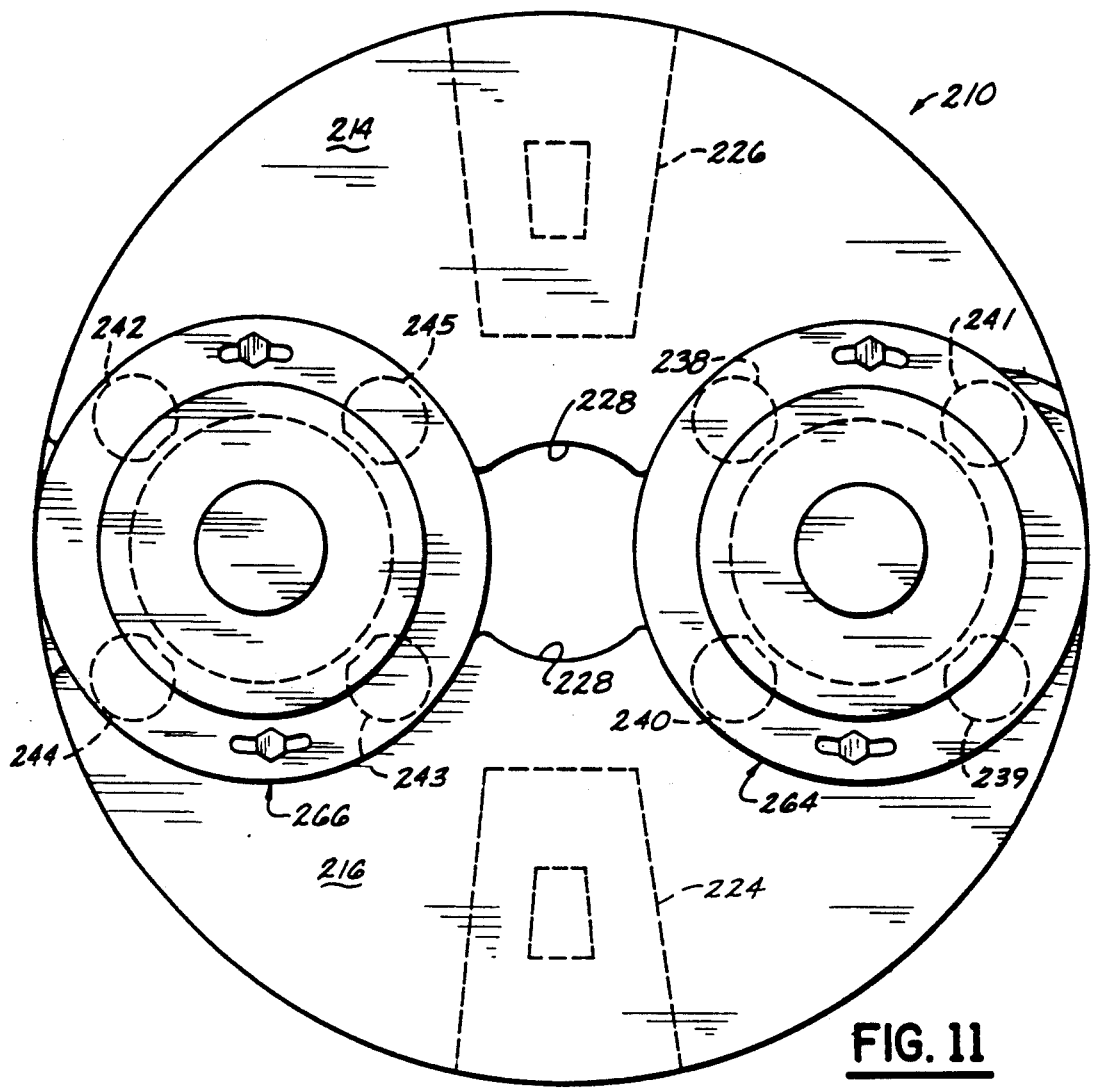
FIG. 11 is a top view of another embodiment of a DC motor.

Referring now to FIGS. 9 and 10, it seems obvious that a similarly powerful single armature motor may be formed by mounting a similar armature indicated at 72' between parallel spaced-apart cooperatively centrally apertured pole pieces 12' and 14' having similar metallic core coils indicated at 47' and 63' interposed between respective end portions of the planar pole plates 12' and 14'. Similarly pairs of cylindrical pole pieces 34'-35' and 36'-37', are transversely interposed between the pole plates 12' and 14' in circumferentially equally spaced relation around the periphery of the armature with one end of each north N pole piece 34'-35' magnetically connected at one end with the north N pole plate 12' and insulated at their other ends from the south S pole plate 14' by nonmagnetic spacers 67'. Similarly the south S end of the south S pole pieces 36'-37' are magnetically connected with the south S pole plate 14' and similarly insulated from the north N pole plate 12'.

In this embodiment the magnetic north N end of the coils 47' and 63' are connected together by a singe plate. Similarly the south S pole end of each coil is connected with the south S pole plate 14'. Magnetic flux is thus concentrated intermediate the ends of the respective pole plate 12' and 14' and provides a concentration of magnetic flux in diametric opposition on the armature 72' by the pairs of pole pieces 34'-35' and 36'-37'.

Referring now, more particularly, to FIGS. 11-15, the reference numeral 210 indicates a two armature direct current motor assembly which is generally cylindrical in overall configuration. An armature supporting framework 212 (FIG. 13) is formed by superposed pairs of substantially semicircular planar plates in which the respective pairs of plates form a north N pole and a south S pole, respectively, as presently described.

Figure 14:
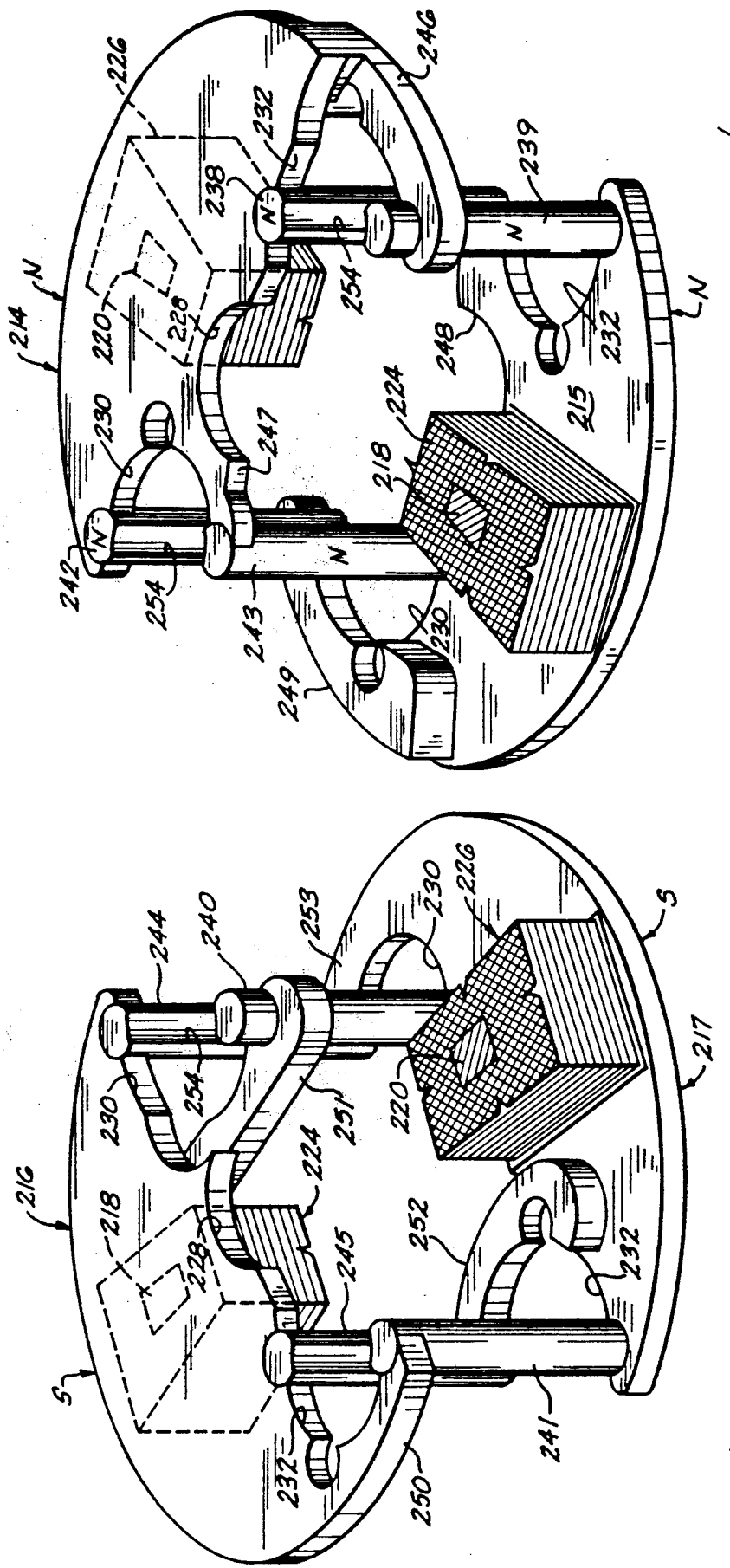
FIG. 14 is an exploded perspective view of FIG. 13.

Each plate of the respective pair of plates is radially offset from the other in stair step diametric edge confronting relation (FIG. 14). Substantially rectangular metallic coil cores 218 and 220 disposed in diametric opposition extend between the plates 215, 216, and 214, 217, respectively. One or more wires 222 are wound around the respective coil core to form a pair of coils 224 and 226.

Figure 12:
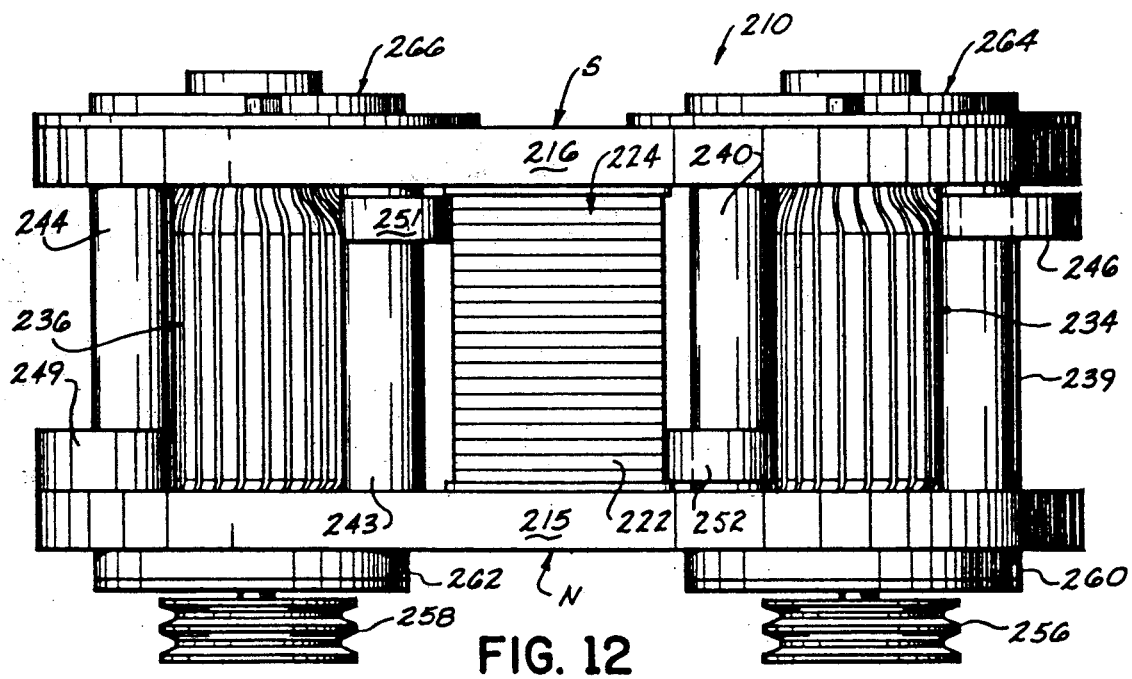
FIG. 12 is an elevational view of FIG. 11.
Figure 13:
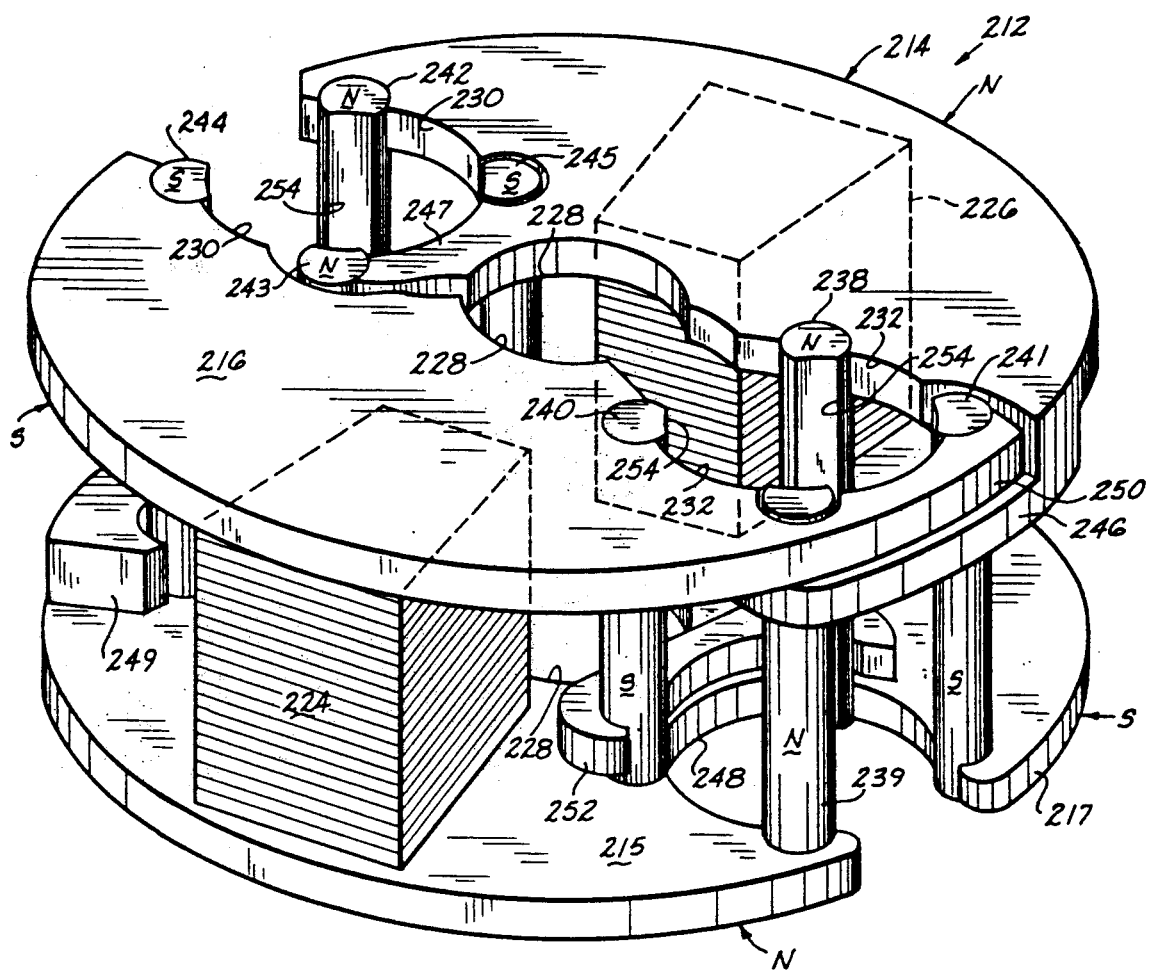
FIG. 13 is a perspective view of the magnetic pole framework, per se, of FIG. 11.
Figure 15:
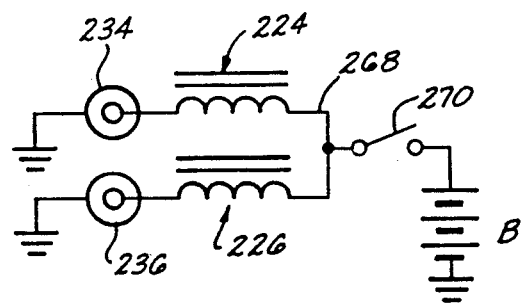
FIG. 15 is a wiring diagram.

When in assembled relation (FIGS. 11 and 13) the spaced-apart confronting diametric edge surface of each semicircular plate 214, 216, and 215, 217 is centrally arcuately curved, as at 228, to define a central cylindrical opening in the armature framework 212. Similarly the radial outward confronting edge of the respective semicircular pole plate of the respective pairs of pole plates is arcuately curved as at 230 and 232 to define a pair of circular openings extending through the armature framework 212 for respectively receiving a pair of armatures 234 and 236 (FIG. 12).

A pair of generally cylindrical magnetic north N pole pieces 238 and 239 and a pair of magnetic south S pole pieces 240 and 241 extend in diametric opposition between the superposed plates and are connected by pairs respectively, with the north N magnetic pole plates 214-215 and south S magnetic pole plates 216-217 adjacent the perimeter of the armature 234. Similarly a second pair of cylindrical north N magnetic poles 242 and 243 and south S poles 244 and 245 extend in diametric opposition between the superposed plates and are connected by pairs respectively, with the north N magnetic pole plates 214-215 and south S pole plates 216-217 adjacent the perimeter of the armature 236.

Pairs of north N pole plate arms 246-247 and 248-249 projecting toward the opposite south S pole plate respectively support the upper ends of north N pole pieces 239 and 243 and depending end portions of the pole pieces 238 and 242. Similarly, pairs of south S pole plate arms 250-251 and 252-253 projecting toward the opposing north N pole plate respectively support the upper end portions of the pole pieces 241 and 240 and the depending end portions of the pole pieces 245 and 244, respectively.

A peripheral portion of the respective cylindrical pole piece 240-245 adjacent the respective armature 234 and 236 is transversely arcuately recessed as at 254. The arc width of each recess is equal to one-half the winding span of the respective armature 234 and 236.

For example, if the winding span of the respective armature is seven then the arc width of the respective pole piece recess 254 is equal to three and one-half spans of a seven span armature for reducing the back e.m.f. on the respective armature during operation as presently explained.

The drive shaft end of each armature 234 and 236 is connected with drive pulleys 256 and 258 and is journalled by bearing equipped housing plates 260 and 262 secured to the pole plates around the respective armature opening 230 and 232.

Similarly, commutator equipped brush and bearing equipped housing plates 264 and 26 operatively support the commutator shaft end of the respective armature 234 and 236.

OPERATION

In operation, wiring 268 (FIG. 15) connects the potential of a battery B to the coils and armatures brushes through an on/off switch 270.

The direction of current flow through the coil 224 is opposite that for the coil 226. For example, as viewed in the drawings, the upper end portion of the coil 224 forms a south S pole and its depending end portion forms a north N pole and conversely, the upper end portion of the coil 226 forms a north N pole and its depending end portion forms a south S pole for energizing the respectively identified pole plates 214-215 and 216-217 as north N and south S poles, respectively.

It seems obvious that permanent magnets may interposed between the respective pole plates in place of the described coils, if desired.

Obviously the invention is susceptible to changes or alterations without defeating its practicability. Therefore, I do not wish to be confined to the preferred embodiment shown in the drawings and described herein.

I claim:

1. A DC motor assembly, comprising:
   a plurality of pairs of magnetizable metallic members respectively disposed in opposing parallel spaced-apart planes;
   magnetic field generating means including magnetic members transversely disposed between and connected with said pairs of metallic members for forming a like plurality of pairs of opposing polarity magnetic pole plates in which adjacent pole plates in the respective plane of the spaced-apart planes are of opposite polarity,
   said magnetic members having opposing end surfaces abutting central confronting surfaces of opposing pole plates and having opposing planar side surfaces normal to the respective planes of said pole plates;
   an armature having a predetermined winding span operatively disposed transversely between said pole plates;
   opposing pairs of rod members extending transversely between and connected, for magnetic flux concentrating and conducting relation, at their respective ends with opposing pole plates of like polarity and in interdigitated relation about the periphery of said armature for forming opposite pairs of like polarity magnetic pole pieces of opposite polarity of one pair of pole pieces with respect to the polarity of the opposite pair of pole pieces with each pole piece of the respective pairs of pole pieces adjacent and in diametric opposition with respect to the armature and the other pole piece of the respective pair of pole pieces,
   each pole piece of the respective pair of pole pieces having a coextensive concave recess facing the perimeter of the armature and formed on a radius complemental with the radius of the armature for forming a fine air gap between a peripheral portion of the armature and the surface defining the adjacent concave recess in the respective said pole piece of said pairs of pole pieces,
   the width of the respective recess of each pole piece of the pairs of pole pieces being substantially one-half the winding span of the armature;
   housing means including bearings for operatively supporting said armature between said plurality of pole plates;
   a source of DC potential; and,
   circuit means including a switch means and wiring connecting the DC potential to ground through said armature for utilizing like polarity magnetic flux influence from opposing pole plates in the respective pole piece of said pairs of pole pieces and in diametric opposition on the armature.

2. A DC motor assembly, comprising:
   a plurality of pairs of magnetizable metallic members respectively disposed in opposing parallel spaced-apart planes;
   coil means between and connected in diametric opposition with said members for forming pairs of opposite polarity magnetic pole plates in which adjacent pole plates in the respective plane of the spaced-apart planes are of opposite polarity,
   each said coil means comprising, a rectangular coil core having opposing end surfaces abutting confronting surfaces of said magnetic pole plates and having opposite planar side surfaces normal to the planes of the confronting surfaces, respectively, of said pole plates;
   at least one wire wound around said coil cores in a manner defining a like plurality of coil magnetic flux generating substantially planar surfaces disposed in a like plurality of planes normal to each other and the adjacent confronting surfaces of each pole plate of said pairs of pole plates;
   first and second armatures each having a predetermined winding span interposed between adjacent coils and operatively disposed transversely between cooperating pairs of said pole plates;
   opposing pairs of rod members transversely extending between and connected, for magnetic flux concentrating and conducting relation, at their respective ends with opposing pole plates of like polarity and in interdigitated relation about the peripheries of said armatures for forming opposite pairs of like polarity magnetic pole pieces of opposite polarity of one pair of pole pieces with respect to the polarity of the opposite pair of pole pieces with each pole piece of the respective pairs of pole pieces adjacent and in diametric opposition with respect to the armature and the other pole piece of the respective pair of pole pieces,
   each pole piece of the respective pair of pole pieces having a coextensive concave recess facing the perimeter of each armature and formed on a radius complemental with the radius of the armature for forming a fine air gap between a peripheral portion of the armature and the surface defining the adjacent concave recess in the respective said pole piece of said pairs of pole pieces, the width of the respective recess of each pole piece of the pairs of pole pieces being substantially one-half the winding span of the armatures;

housing means including bearings for operatively supporting said armature between said plurality of pole plates;

a source of DC potential; and, circuit means including a switch means and wiring connecting the DC potential to ground through said armatures for utilizing like polarity magnetic flux influence from opposing pole plates in the respective pole piece of said pairs of pole pieces and in diametric opposition on the armatures.

3. A DC motor assembly, comprising:

opposing pairs of semicircular planar magnetizable metallic members disposed in coaxial spaced superposed relation, each member of said pairs of members having a diametric edge surface disposed in close spaced relation with respect to the diametric edge surface on an opposite polarity semicircular member;

coil means between and connected in diametric opposition with said members for forming pairs of opposite polarity semicircular magnetic pole plates, each said coil means comprising, a rectangular coil core having opposing end surfaces abutting confronting surfaces of said plates and having opposite planar side surfaces normal to the planes of the confronting surfaces, respectively, of said pole plates;

at least one wire around said coil cores in a manner defining a like plurality of coil magnetic flux generating substantially planar surfaces disposed in a like plurality of planes normal to each other and the adjacent confronting surfaces of each pole plate of said pairs of pole plates;

first and second armatures each having a predetermined winding span operatively disposed transversely in diametric opposition between said superposed pairs of semicircular pole plates;

opposing pairs of rod members extending between and connected, by pairs for magnetic flux concentrating and conducting relation, at their respective ends with opposing pole plates of like polarity and in interdigitated relation about the peripheries of said armatures for forming opposite pairs of like polarity magnetic pole pieces of opposite polarity of one pair of pole pieces with respect to the polarity of the opposite pair of pole pieces with each pole piece of the respective pairs of pole pieces adjacent and in diametric opposition with respect to the respective armature and the other pole piece of the respective pair of pole pieces, each pole piece of the respective pair of pole pieces having a coextensive concave recess facing the perimeter of each armature and formed on a radius complemental with the radius of the armature for forming a fine air gap between a peripheral portion of the armature and the surface defining the adjacent concave recess in the respective said pole piece of said pairs of pole pieces, the width of the respective recess of each pole piece of the pairs of pole pieces being substantially one-half the winding span of the armatures;

nonmagnetic housing means including bearings for operatively supporting said armatures between said pair of pole pieces;

a source of DC potential;

primary circuit means including parallel primary wiring respectively connecting the DC potential to ground in series through one said armature and an adjacent said coil for generating magnetic flux influence from opposing directions in the respective pole piece of said pair of pole pieces and in diametric opposition on the respective armature; and, electrical current control means including first switch means interposed in said primary wiring.

* * * * *